United States Patent Office 2,875,614
Patented Mar. 3, 1959

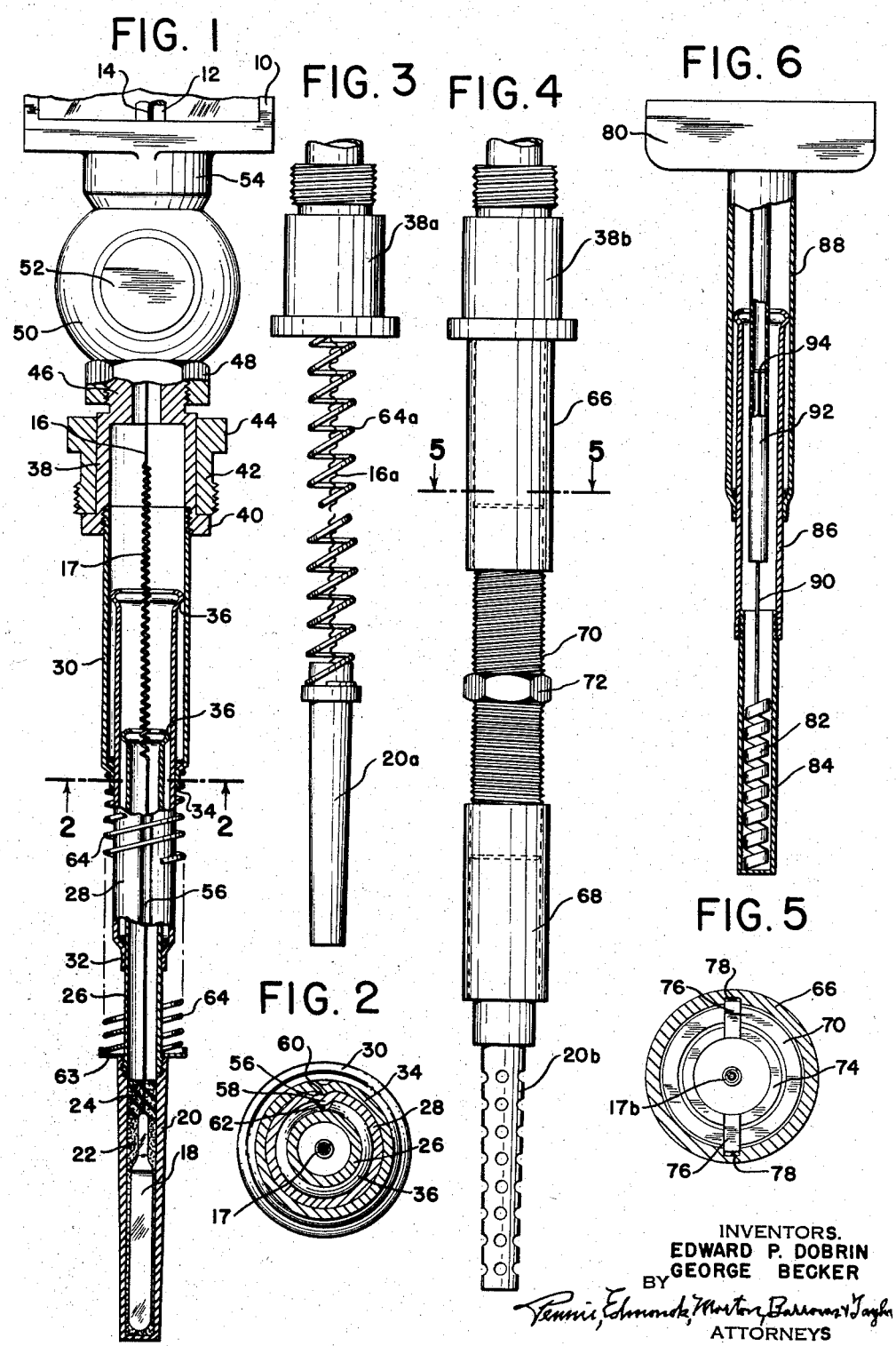

2,875,614

ADJUSTABLE-LENGTH THERMOMETER

Edward P. Dobrin, Massapequa Park, and George Becker, Queens Village, N. Y., assignors to Weksler Instrument Corporation, a corporation of New York Application March 23, 1955, Serial No. 496,093

1 Claim. (Cl. 73—368)

Our invention relates to an improved thermometer construction having a longitudinally-adjustable stem. More particularly, the invention relates to a thermometer or temperature-indicating instrument in which the stem portion, usually extending into an installation from the mounting means carried by the instrument, is adjustable longitudinally to the required length.

In the manufacture of thermometers or temperature-indicating instruments at the present time, it is necessary to manufacture a given type of instrument with as many as eight different lengths of stems projecting from the mounting means to the bulb. The expense involved in manufacturing the different sizes has been considerable because of the large stock of instruments which must be carried as well as the various size packing boxes which must be made and handled.

The primary object of our invention is, therefore, to provide an improved temperature-indicating or measuring instrument, in which the connection between the bulb and the mounting means indicator is readily adjustable longitudinally for the accommodation to different installations particularly different depths of sockets.

A further object of the invention is to provide a temperature-indicating device, which can be made in a single size and which is readily adjustable to different lengths as required.

According to our invention, it has been discovered that the foregoing objects may be achieved by providing a temperature-indicating instrument comprising a temperature-indicating means, a temperature-responsive means, such as a bulb, a readily expansible and contractable means for transmitting temperature changes from the temperature-responsive means to the temperature-indicating means, and a readily expansible and contractable connection for supporting the temperature-responsive means. In this construction of the instrument, the readily expansible and contractable supporting means surrounds and protects the means for transmitting the temperature changes.

The means for effecting the longitudinal adjustment of the temperature-responsive means or bulb with respect to the indicator may be applied to industrial glass thermometers, dial-indicating thermometers, recording and controlling temperature indicators whether of vapor, gas or liquid-filled types, or provided with bimetal actuating temperature-responsive means. In constructions where liquid or gas is employed, the expansible and contractable means for transmitting temperature changes is advantageously a coiled capillary connecting the bulb with the indicator or dial.

According to a preferred construction the means for supporting and protecting the expansible and contractable means for transmitting temperature changes, for example, a coiled capillary tube, comprises a telescopic sleeve construction supporting the bulb or its equivalent from the indicator.

The longitudinally-adjustable thermometer construction of our invention includes other features and advantages described more in detail hereinafter in connection with the illustrative embodiments shown in the accompanying drawings forming a part of this application.

In the drawings:

Fig. 1 is a broken view partly in vertical section of a thermometer constructed in accordance with our invention;

Fig. 2 is a horizontal sectional view taken on the line 2—2 of Fig. 1;

Figs. 3 and 4 are broken elevational views of a portion of the thermometer, such as that shown in Fig. 1 showing modified forms of the longitudinally-adjustable thermometer stems.

Fig. 5 is a horizontal cross-sectional view taken on the line 5—5 of Fig. 4; and Fig. 6 is a view partly in vertical section showing the application of the longitudinally-expansible structure of Fig. 1 applied to a bimetal type thermometer.

Referring to Figs. 1 and 2 of the drawings illustrating the preferred form of the invention, the thermometer construction shown therein includes a case 10 of any desired or conventional construction supporting and enclosing a tubular glass indicator 12 mounted over a scale provided in the case in the usual manner. The capillary 14 in the indicator 12 is connected by a metal capillary tube 16, having a coiled flexible and extensible section 17, with a glass thermometer bulb 18 mounted in and enclosed by a metal guard or casing 20. The capillary tube 16 is connected to the glass indicator tube 12 and to the bulb 18 by fused glass-to-metal joints. The bulb 18 is supported in the casing 20 in asbestos packing 22 and the portion of the capillary tube 16 extending therefrom is supported in the upper portion of the casing 20 by means of a packing member 24. The casing 20 may be perforated or have a screen-like structure, such as that shown in Fig. 4 with the bulb mounted therein in spaced relation. The perforated casing permits circulation and direct contact of liquid or gases with the bulb 18.

The thermometer case 10 and the casing 20 are rigidly and adjustably interconnected by means of a telescoping stem structure including three progressively larger telescoping tubular sections 26, 28 and 30 surrounding and protecting the capillary 16. The tubular section 26 is threaded to the top of the casing 20 and extends with a sliding fit through a reduced end portion 32 of the tubular section 28, which similarly extends through a reduced portion 34 of the lower end of the tubular section 30. The upper ends of the tubular sections 26 and 28 are both provided with expanded annular bead sections 36, respectively slidably engaging the inner surfaces of the tubular sections 28 and 30. The upper end of the tubular section 30 is threaded into the lower portion of a sleeve member 38 having a bearing flange 40 at its lower end, above which is provided a threaded swivel nut 42 having conventional hex nut surfaces 44.

The sleeve 38 includes a reduced threaded portion 46 carrying a hard steel clamping nut 48 having sharp ring-shaped edges for engaging the spherically-shaped exterior surfaces of a brass hinge member 50 provided with a hinge pin or shaft 52, this hinge construction being of the type disclosed in pending application Ser. No. 404,971, filed January 17, 1954, and which forms no part of the present invention. While not shown in the present drawings, an upper further-reduced portion of the sleeve 38 is threaded into the side of the pin or shaft 52, which is partly hollowed out, so that a coiled portion of the capillary 16 extends therethrough and through a supporting collar 54 by which the case 10 is fixed to or mounted on the hinge portion 50.

Incidentally, the hinge portion 50 comprises a pair of downwardly-extending rings or spaced-apart ring sections through which the pin or shaft 52 extends. The reduced portion of the sleeve 38 above the threaded section 46 extends between the ring sections of the hinge member 50 so that when the nut 44 is screwed into a mounting with the telescoping stem extending thereinto, the case 10 may be swung on the pin 52 to any desired angle and locked by the nut 48, as more fully described in the above-mentioned application.

The telescoping sections 26, 28 and 30 are preferably round in cross-section and splined or keyed together to prevent relative rotation, for example, in the manner illustrated in Fig. 2 of the drawings. The outer surface of the section 28 is provided with a straight longitudinal groove 56 in its external surface. When this groove is pressed into the material, it also produces an interior rib 58. The section 30 is keyed to the groove 56 by means of an inwardly-projecting rib or detent 60 in the bearing portion 34. The section 26 is splined or keyed to the next adjacent section 28 by providing a groove 62 in the expanded bead 36 of section 26 which engages the interior rib 58 of section 28. This arrangement therefore, as shown in Fig. 2, permits the telescoping of the sections 26, 28 and 30 but prevents relative rotation. In a telescoping operation, the rib or detent 60 slides longitudinally in the groove 56 and the longitudinal rib 58 slides in the groove 62.

In the construction shown in Fig. 1, the expanded beads 36 cooperate with the reduced sections 32 and 34, respectively, to prevent separation of the assembled telescoping sections 26, 28 and 30 and to provide a laterally rigid structure.

While the telescoping elements 26, 28 and 30 are preferably round in cross-section, they may be non-circular, such as oval, square or polygonal straight tubes slidably fitted together, with means to prevent separation of the assembly, thereby avoiding the necessity of the splined arrangement shown in Fig. 2. Such an assembly may include the reduced portions, such as 32 and 34 and the expanded beads 36, both of which will have the same cross-sectional shape as the tubes.

As shown in Fig. 1, the expansible and contractable thermometer stem assembly advantageously includes a washer or flange type support 63 which may rest on the top of the casing or guard 20 and support the lower end of a biasing compression coil spring 64, which is adapted to make the stem self-adjusting and to extend the telescoping stem to its longest dimension. The member 63 serves as a seat for the lower end of the coil spring 64. The upper end of the coil spring 64 fits snugly around the reduced portion 34 of the tube 30 so that the shoulder between the body of the tube and the reduced portion 34 serves as a seat or bearing for the upper end of the coil spring. The same result is obtained if the upper end of the spring is set under the flange 40, but the spring would need to be longer and of larger diameter, at least around the tube 30. The spring 64 advantageously has sufficient strength to maintain the telescoping stem extended until it is inserted in a well or socket and compressed to the depth of the well. The spring maintains a substantially constant pressure regardless of temperature changes or vibration conditions and will prevent any damage due to vibration or temperature changes. When the thermometer is packed, the stem assembly may be contracted to conserve packing space. When the annular beads 36 of the tubes 26 and 28 respectively engage the reduced sections 32 and 34, the elements are prevented from being separated by the action of the spring 64.

The thermometer shown in Figs. 1 and 2 may be used with or without the spring 64. When the thermometer does not include the spring 64 and is ready to be installed in a piece of equipment, the telescoping stem is adjusted to extend into the equipment the desired or required distance. Thereafter, the stem is inserted in the thermometer well and the nut 42 is drawn up to fit the shoulder 40 tightly onto the socket mounting of the equipment. The same thermometer may be used in installations of various types which would normally require internally-extending stems of varying lengths. If the thermometer is provided with the biasing spring 64, the stem telescopes and adjusts itself to the depth of the thermometer well.

Fig. 3 shows a modified form of construction, not including a laterally-rigid stem structure, in which a spiral spring 64a directly surrounds the flexible and extensible capillary 16a extending between the bulb casing 20a and the sleeve member 38a. The upper end of the spiral spring 64a is secured to the inside of the sleeve member 38a in any desired manner, while the lower end of the spring is attached to the upper end of the bulb casing 20a. This type of extensible thermometer construction provides a self-adjusting stem adapted to fit into thermometer wells or receptacles having various depths. The self-adjusting types of construction, as illustrated in Figs. 1 to 3 always maintain a constant pressure in the well or socket regardless of temperature changes or vibration conditions.

The form of construction shown in Figs. 4 and 5 provides a more rigid type of extensible and retractable stem construction through which the flexible and extensible capillary extends. According to the showing in Fig. 4, the sleeve member 38b is fixed to an internally threaded sleeve section 66, while the screen type thermometer bulb guard or casing 20b is fixed to an internally threaded tubular scetion 68. The tubular sections 66 and 68 are connected by a rotatable tubular section 70 provided with a central hex nut portion 72 and having its end portions threaded externally with right and left hand threads respectively threaded into matching threads in the tubular sections 66 and 68. In this construction the length of the stem portion below the sleeve 38b is readily adjusted by applying a wrench to the nut section 72 and rotating the tubular section 70 with respect to the tubular sections 66 and 68 to move them toward or away from each other. The sections 66 and 68 may be externally threaded and the section 70 internally threaded.

Relative rotation between the tubular sections 66 and 68 is prevented by means of a construction as shown in Fig. 5 wherein an internal floating tube 74 is provided which extends through the tube 70 and slightly beyond its end portions. At each of the opposite ends of the tube 74, just beyond the ends of the tube 70, the tube 74 is provided with diametrically projecting pins 76, which extend into internal straight longitudinal slots 78 in the tubular sections 66 and 68. The tube 74, together with its projecting pins, therefore, insure against relative rotation of the tubes 66 and 68 when the externally-threaded tube 70 is rotated with respect thereto.

The construction shown in Figs. 4 and 5 provides a rigid stem structure which is readily adjustable lengthwise for various depths of thermometer wells or sockets. The rigidity of the construction may be increased by providing lock nuts on the threaded sections of the tube 70 for engagement against the respective ends of the tubes 66 and 68 when the correct stem length has been determined.

The form of universally-adjustable thermometer stem construction described in connection with Fig. 1 is illustrated in Fig. 6 for a thermometer having a dial indicator mounted in a case 80 in the usual manner, the dial being actuated by a bimetal temperature-responsive member illustrated as a conventional type spiral strip of biametal 82, the lower end of which is fixed in the bottom of a tubular casing 84. The casing 84 is connected to the indicator dial casing 80 by means of telescoping tubular sections 86 and 88, respectively fixed to the casings 84 and 80. The telescoping sections 86 and 88 are preferably round in cross-section and splined to each other to prevent relative rotation, in the manner described above in connection with Fig. 1 of the drawings. These sections, however, instead of being splined for preventing relative rotation may be non-cylindrical, such as oval, square or polygonal.

The rotating movement of the spiral bimetal temperature-responsive member 82 is transmitted to the indicator dial by means of an extensible connection including a rod 90, one end of which is fixed to the upper end of the bimetal member 82, while the other end extends through a bottom opening in a rotatable tube 92 having its upper end connected into the dial indicator. The upper end portion of the rod 90 is slidably arranged in the tube 92 to accommodate the longitudinal adjustability of the thermometer stem, the rod carrying a fixed cross pin 94 at its upper end, the ends of which project into diametrically opposed straight longitudinally-extending grooves in the inner wall of the tube 92.

The upper end of the rod 90 may be slidably keyed to the tube 92 by other means, as for example, the tube 92 may be non-cylindrical and the pin 94 replaced by a plate non-rotatably and slidably fitting the interior of the tube 92, or the rod 90 and tube 92 may be square, for example, with the rod slidably fitting in the tube. The rotative motion of the bimetal 82 is, therefore, transmitted to the dial of the thermometer regardless of the length to which the thermometer stem is extended when in use. The telescoping construction shown in Fig. 6 may include an internal or external spiral spring for making the stem of the thermometer self-adjustable to various depths of thermometer wells or sockets, in the same manner as described above in connection with Figs. 1 and 2.

While various embodiments of the invention have been described above, it is to be understood that the universally adjustable thermometer stem may be made in other ways to accomplish the improved results accruing from the invention. The universally adjustable stem of the thermometer simplifies the design and layout of instrumentation and greatly reduces the inventory of thermometers which must be carried for installations requiring different stem lengths. Maintenance costs are also reduced as a result of the improved construction permitting stem adjustability to any desired length, or the transfer of the thermometer from one installation to another.

We claim:

A temperature-indicating instrument comprising a case carrying a temperature-indicating means, a sleeve, means for rigidly connecting the sleeve to the case, means associated with the sleeve adjacent the temperature-indicating means for securing the instrument to an installation, a lengthwise-extensible and contractible stem structure carried by the sleeve opposite the case and adapted to extend into a well in the installation, a casing at the projecting end of the stem structure, a temperature-responsive means mounted in fixed position in and surrounded by the casing at the projecting end of the stem structure, a lengthwise-extensible and contractible temperature-change transmitting means extending through the stem structure from the temperature-responsive means in the casing to the temperature-indicating means for transmitting temperature changes from the temperature-responsive means to the temperature-indicating means, said stem structure including a plurality of laterally-rigid telescoping tubes connecting said sleeve and casing and through which said temperature-change transmitting means extends, means for preventing relative rotation of said tubes with respect to each other, said plurality of telescoping tubes including a first tube having one end rigidly attached to the sleeve and extending toward the casing, a second tube having one end rigidly attached to the casing and extending toward the sleeve, a third tube arranged with its ends respectively telescopically associated in a laterally-rigid manner with the extending portions of said first and second tubes, said telescoping tubes being freely movable lengthwise relative to each other, whereby, when said stem structure is inserted in the well of the installation with said telescoping tubes in their extended positions, the stem structure adjusts itself lengthwise to the depth of the well.

References Cited in the file of this patent
UNITED STATES PATENTS

| | | |
|---|---|---|
| 1,159,712 | Ross | Nov. 9, 1915 |
| 1,451,527 | Boyce | Apr. 10, 1923 |
| 1,733,804 | Ileman | Oct. 29, 1929 |

FOREIGN PATENTS

| | | |
|---|---|---|
| 490,420 | Great Britain | Aug. 10, 1938 |
| 560,398 | Great Britain | Apr. 3, 1944 |